(No Model.)

C. J. WAGENER.
VEHICLE TIRE.

No. 551,481. Patented Dec. 17, 1895.

Witnesses:
Jos. H. Blackwood
Albert B. Blackwood

Inventor.
Christian J. Wagener
by Wm. W. Doolittle
Attorneys

UNITED STATES PATENT OFFICE.

CHRISTIAN J. WAGENER, OF PITTSBURG, PENNSYLVANIA.

VEHICLE-TIRE.

SPECIFICATION forming part of Letters Patent No. 551,481, dated December 17, 1895.

Application filed April 10, 1895. Serial No. 545,200. (No model.)

*To all whom it may concern:*

Be it known that I, CHRISTIAN J. WAGENER, a citizen of the United States, residing at Pittsburg, in the county of Allegheny and State of Pennsylvania, have invented certain new and useful Improvements in Vehicle-Tires; and I do hereby declare the following to be a full, clear, and exact description of the invention, such as will enable others skilled in the art to which it appertains to make and use the same.

My invention relates to improvements in vehicle-wheels, and more particularly to devices of the class shown and described in Letters Patent numbered 515,540, granted to me February 27, 1894.

The objects of my invention are to provide suitable and simple means for enabling vehicles to easily turn out of street railway and other tracks and to strengthen and prolong the life of the wheels.

The difficulty encountered in "turning out" of street-car tracks by vehicles having the ordinary wheel-tires, due to the abrupt meeting of the edge of the tire with the edge of the rail-flange, is well known.

The purpose of my invention is to enable the wheels to roll or ride over instead of being caught by and made to slide along the rails, thereby saving the wheels and the vehicle from the great destruction, wear and strain occasioned by the abrupt and sliding contact referred to.

In my patent referred to an annular rotatable rim is provided, held against the outer side of the wheel, the outer edge of which rim is provided with a series of grooves which strike against the projecting portions of the rails with which the wheels may come in contact.

I am aware that tires having one or both of their side edges provided with notches, grooves or corrugations of a particular form are old for this purpose; but my invention consists of a wheel-tire having one of its sides beveled inwardly and provided on said beveled side with a series of grooves, each of said grooves of an elongated twisted form, commencing at the bottom of the said side, extending along said side to the upper edge of the tire, then extending along and confined to the top of said edge, said groove having a uniformly gradually increasing depth from both ends to its center, substantially as hereinafter described.

My invention is illustrated in the accompanying drawings, in which—

Figure 1:
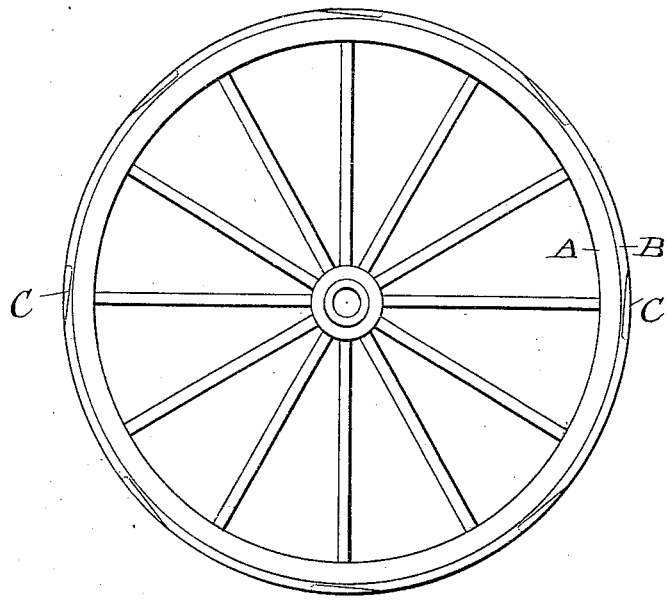
Figure 2:
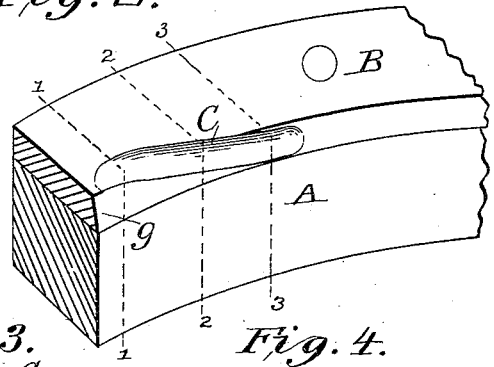
Figure 3:
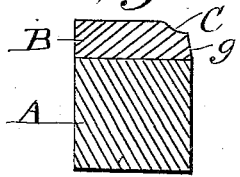
Figure 4:
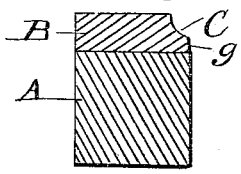
Figure 5:
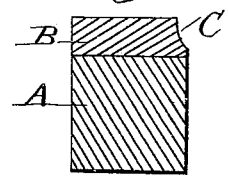

Figure 1 is a side view of a vehicle wheel and tire with my invention applied to the tire; Fig. 2, a perspective view of a section of the tire and felly; Figs. 3, 4 and 5, transverse sections of such tire on lines 1 1, 2 2, and 3 3, of Fig. 2; and Fig. 6, a side view of a modification, showing the tire provided with a depending flange setting into the felly, with the grooves applied to such flange and top surface of the tire precisely as they are to the plain ordinary tire.

Referring to the drawings, Figs. 1 to 5, A is a felly and B a tire, both of the ordinary construction. The tire B is provided at intervals along its edge and top surface with grooves C. These grooves, instead of being mere depressions, or notches, or corrugations, or cuts, are long grooves forming a twist, and of gradually increasing and decreasing depth— that is to say, the groove commences at the lower edge of one side of the tire, gradually increases in twist and depth, and winds gradually to the top of the tire, extends along the upper surface of one side edge of the tire, and gradually merges into its top surface on the same side. By this form of groove when the edge of a rail enters the same the wheel is relieved from any abrupt contact with the rail or its flange and is gradually, easily and smoothly lifted onto and over the rail and its flange. The upper portion of the tire B is also beveled inwardly at $g$. This is for the purpose of avoiding the contact of the outer edge of the tire with the inner edge of the flange of the rail until the wheel is turned to cross the rail, when its flange at once enters a groove C, and the wheel is lifted and rolled over the rail as above described.

Figure 6:
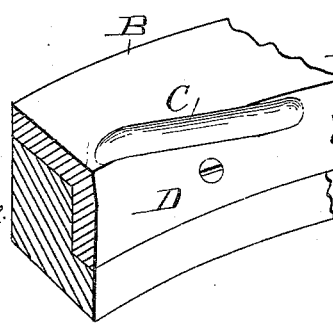

In Fig. 6 the tire is provided with a flange D; but the tire is provided at the same points with precisely the same groove, of the same dimensions and extent.

The tire may be provided on one or both sides with the grooves described.

Having thus described my invention, what I claim is—

A vehicle wheel tire having one of its sides beveled inwardly and provided on said beveled side with a series of grooves, each of said grooves of an elongated twisted form commencing at the bottom of the said side, extending upwardly along said side to the upper edge of the tire, then extending along and confined to the top of said edge, said groove having a uniformly gradually increasing depth from both ends to its center, substantially as described.

In testimony whereof I affix my signature in presence of two witnesses.

CHRISTIAN J. WAGENER.

Witnesses:
W. G. DOOLITTLE,
JOHN M. PRESCOTT, Jr.